United States Patent
Suyama

(10) Patent No.: US 11,211,640 B2
(45) Date of Patent: Dec. 28, 2021

(54) AQUEOUS ELECTROLYTE SOLUTION, AND AQUEOUS LITHIUM ION SECONDARY BATTERY

(71) Applicant: Toyota Jidosha Kabushiki Kaisha, Toyota (JP)

(72) Inventor: Hiroshi Suyama, Mishima (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 1 day.

(21) Appl. No.: 16/229,628

(22) Filed: Dec. 21, 2018

(65) Prior Publication Data

US 2019/0214687 A1 Jul. 11, 2019

(30) Foreign Application Priority Data

Jan. 9, 2018 (JP) .............................. JP2018-001430

(51) Int. Cl.
*H01M 10/36* (2010.01)
*H01M 4/485* (2010.01)
(Continued)

(52) U.S. Cl.
CPC .............. *H01M 10/36* (2013.01); *H01M 4/38* (2013.01); *H01M 4/48* (2013.01); *H01M 4/485* (2013.01);
(Continued)

(58) Field of Classification Search
CPC ...... H01M 10/36; H01M 4/485; H01M 4/625; H01M 4/38; H01M 4/48; H01M 4/583; H01M 4/661; H01M 2300/0002
See application file for complete search history.

(56) References Cited

U.S. PATENT DOCUMENTS

2009/0087742 A1 4/2009 Martinet et al.
2012/0318360 A1 12/2012 Kawata et al.
(Continued)

FOREIGN PATENT DOCUMENTS

CN 102780034 A 11/2012
CN 104882637 A 9/2015
(Continued)

OTHER PUBLICATIONS

Yamada, Yuki et al., "Hydrate-melt electrolytes for high-energy-density aqueous batteries", Nature Energy, Aug. 26, 2016.
(Continued)

*Primary Examiner* — Milton I Cano
*Assistant Examiner* — Jenna Shulman
(74) *Attorney, Agent, or Firm* — Dinsmore & Shohl LLP

(57) ABSTRACT

Electrolysis of an aqueous electrolyte solution on a surface of an anode is suppressed when an aqueous lithium ion secondary battery is charged/discharged. In an aqueous electrolyte solution that is used for an aqueous lithium ion secondary battery, at least one metal cation selected from an aluminum ion, a titanium ion, a manganese ion, a zinc ion, a gallium ion, a yttrium ion, a zirconium ion, an indium ion, a lanthanum ion, a cerium ion, a neodymium ion, and a hafnium ion is contained so that its content is more than 0 mol and no more than 0.01 mol per kilogram of the aqueous electrolyte solution, in addition to a lithium ion and at least one imide based anion.

7 Claims, 7 Drawing Sheets

(51) Int. Cl.
  *H01M 4/62* (2006.01)
  *H01M 4/38* (2006.01)
  *H01M 4/48* (2010.01)
  *H01M 4/583* (2010.01)
  *H01M 4/66* (2006.01)

(52) U.S. Cl.
  CPC .......... *H01M 4/583* (2013.01); *H01M 4/625* (2013.01); *H01M 4/661* (2013.01); *H01M 2300/0002* (2013.01)

(56) References Cited

U.S. PATENT DOCUMENTS

| | | | |
|---|---|---|---|
| 2014/0342249 | A1 | 11/2014 | He et al. |
| 2016/0134002 | A1 | 5/2016 | Mizuno et al. |
| 2016/0149249 | A1* | 5/2016 | Pozvonkov ......... H01M 8/2483 429/490 |
| 2016/0181664 | A1 | 6/2016 | Sakemi |
| 2016/0351968 | A1 | 12/2016 | Wang et al. |
| 2018/0269472 | A1 | 9/2018 | Ise et al. |
| 2018/0277903 | A1 | 9/2018 | Xu et al. |
| 2019/0036151 | A1 | 1/2019 | Takechi et al. |
| 2019/0067747 | A1 | 2/2019 | Nakayama et al. |

FOREIGN PATENT DOCUMENTS

| | | |
|---|---|---|
| CN | 105826520 A | 8/2016 |
| EP | 3413391 A1 | 12/2018 |
| JP | 2009-259473 A | 11/2009 |
| JP | 2012-009322 A | 1/2012 |
| JP | 2017126500 A | 7/2017 |
| JP | 2018-156840 A | 10/2018 |
| JP | 2019-050183 A | 3/2019 |
| WO | 2012145796 A1 | 11/2012 |
| WO | 2017105578 A2 | 6/2017 |
| WO | 2017135323 A1 | 8/2017 |

OTHER PUBLICATIONS

Final Office Action dated Jun. 21, 2021 for U.S. Appl. No. 16/035,787; 8 pages.
Office Action dated Feb. 7, 2020 in U.S. Appl. No. 16/035,787.
Office Action dated Aug. 5, 2020 in U.S. Appl. No. 16/035,787.
Office Action dated Dec. 8, 2020 in U.S. Appl. No. 16/035,787.
Suo, Liumin et al., ""Water-in-salt" electrolyte enables high-voltage aqueous lithium-ion chemistries", Science 350, 2015, p. 938-943.

* cited by examiner

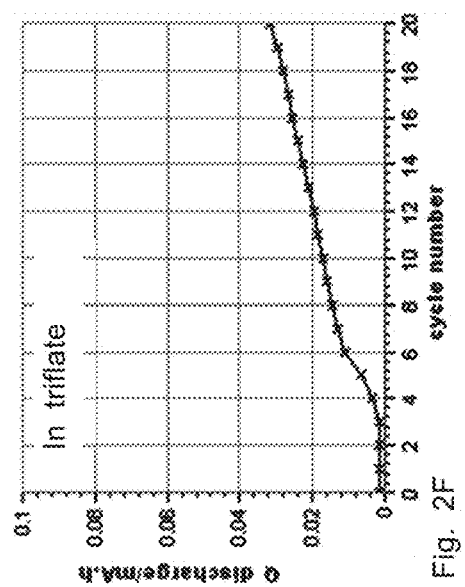
Fig. 2A
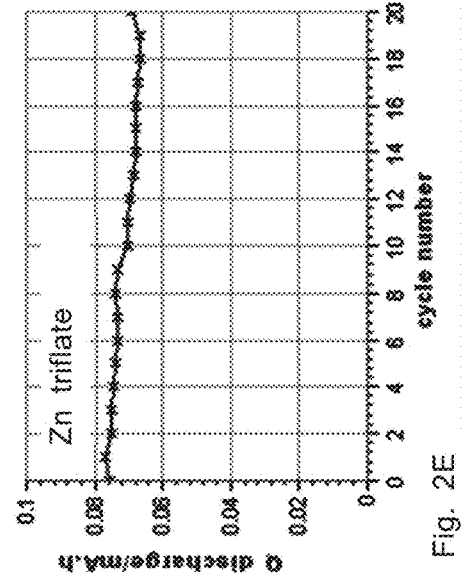
Fig. 2B
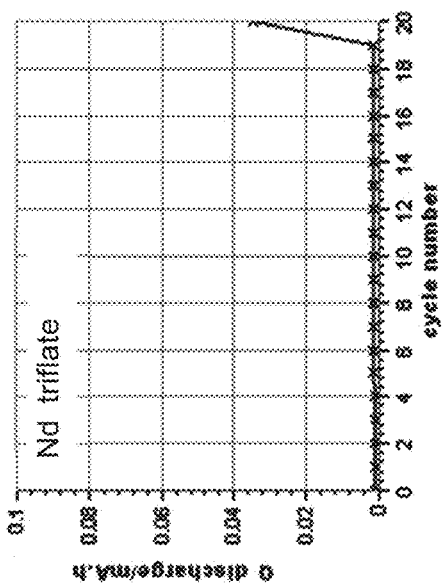
Fig. 2C
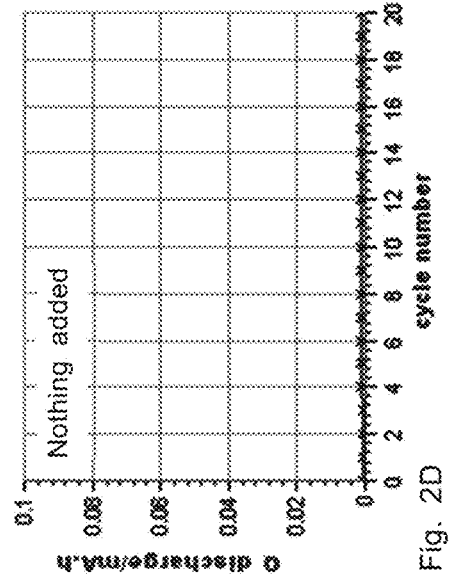
Fig. 2D
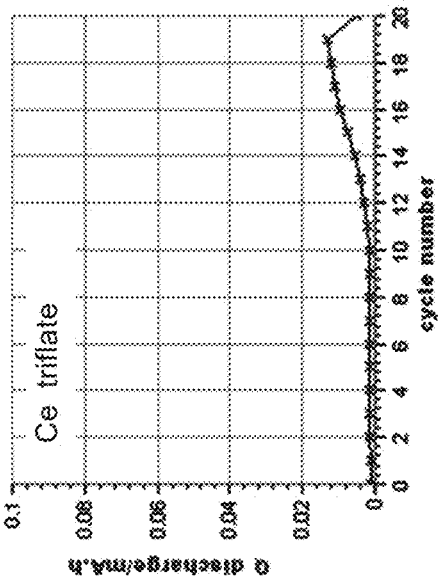
Fig. 2E
Fig. 2F

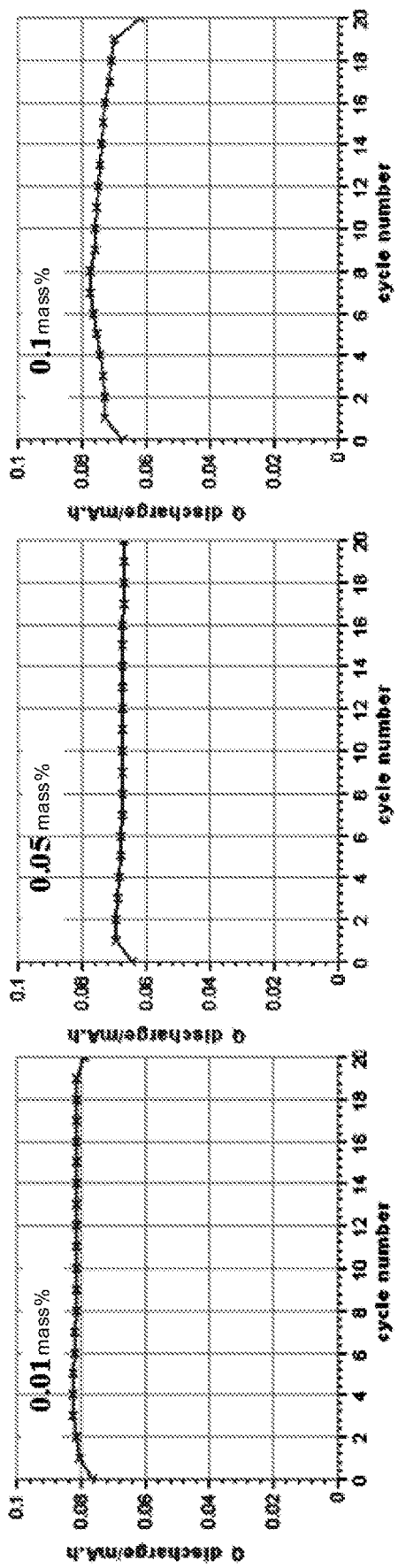

AQUEOUS ELECTROLYTE SOLUTION, AND AQUEOUS LITHIUM ION SECONDARY BATTERY

CROSS REFERENCE TO RELATED APPLICATIONS

The present application claims priority to Japanese Patent Application No. 2018-001430 filed on Jan. 9, 2018, the entire contents of which are incorporated in the present specification by reference.

FIELD

The present application discloses an aqueous electrolyte solution used for an aqueous lithium ion secondary battery etc.

BACKGROUND

A lithium ion secondary battery that contains a flammable nonaqueous electrolyte solution is equipped with a lot of members for safety measures, and as a result, an energy density per volume as a whole of the battery becomes low, which is problematic. In contrast, a lithium ion secondary battery that contains a nonflammable aqueous electrolyte solution does not need safety measures as described above, and thus has various advantages such as a high energy density per volume. However, a conventional aqueous electrolyte solution has a problem of narrow potential windows, which restrict active materials etc. that can be used.

As one means for solving the problem that an aqueous electrolyte solution has, Yuki Yamada et al., "Hydrate-melt electrolytes for high-energy-density aqueous batteries", NATURE ENERGY (26 Aug. 2016) (Non Patent Literature 1) and JP 2017-126500 A (Patent Literature 1) and US 2016/0351968 A1 (Patent Literature 2) disclose that dissolving a specific lithium salt in an aqueous electrolyte solution at a high concentration can expand the ranges of potential windows of the aqueous electrolyte solution. In Non Patent Literature 1, charge/discharge of an aqueous lithium ion secondary battery is confirmed using lithium titanate, which is difficult to be used as an anode active material in a conventional aqueous lithium ion battery, as an anode active material, owing to the use of an aqueous electrolyte solution of a high concentration as described above.

SUMMARY

Technical Problem

According to new findings of the inventor of the present application, there is a case where an aqueous electrolyte solution is electrolyzed on a surface of an anode due to overvoltage etc. even if an aqueous lithium ion secondary battery is made using the aqueous electrolyte solution, which is of a high concentration as described above. Therefore, a conventional aqueous lithium ion secondary battery is difficult to be charged/discharged, or even if the battery can be charged/discharged, charge/discharge cycles are unstable, which is problematic.

Solution to Problem

The present application discloses, as one means for solving the problem, an aqueous electrolyte solution that is used for an aqueous lithium ion secondary battery, the aqueous electrolyte solution comprising: water; a lithium ion; at least one imide based anion selected from a TFSI anion and a FSI anion; and at least one metal cation selected from an aluminum ion, a titanium ion, a manganese ion, a zinc ion, a gallium ion, a yttrium ion, a zirconium ion, an indium ion, a lanthanum ion, a cerium ion, a neodymium ion, and a hafnium ion, wherein pH of the aqueous electrolyte solution is 3 to 12, and a content of the metal cation is more than 0 mol and no more than 0.01 mol per kilogram of the aqueous electrolyte solution.

"TFSI anion" is a bistrifluoromethanesulfonylimide anion represented by the following formula (1).

"FSI anion" is a bisfluorosulfonylimide anion represented by the following formula (2).

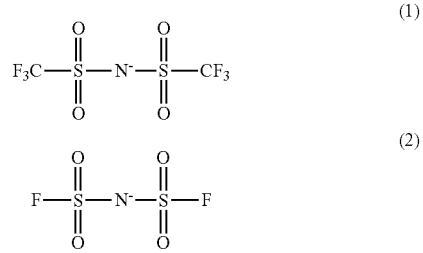

In some embodiments of the aqueous electrolyte solution of this disclosure, the metal cation is a hafnium ion.

In some embodiments of the aqueous electrolyte solution of this disclosure, the metal cation is at least one selected from a cerium ion, and a neodymium ion, and the content of the metal cation is no less than 0.0008 mol per kilogram of the aqueous electrolyte solution.

The present application discloses, as one means for solving the problem, an aqueous lithium ion secondary battery comprising: a cathode; an anode; and the aqueous electrolyte solution of the present disclosure.

In some embodiments of the aqueous lithium ion secondary battery of this disclosure, the anode contains at least one titanium-containing oxide selected from lithium titanate and titanium oxide as an anode active material.

In some embodiments of the aqueous lithium ion secondary battery of this disclosure, the anode includes an anode active material layer including an anode active material and a conductive additive, and the conductive additive is formed of a material of a higher work function than that of a metal forming the metal cation contained in the aqueous electrolyte solution.

In some embodiments of the aqueous lithium ion secondary battery of this disclosure, the conductive additive is formed of a carbon material.

In some embodiments of the aqueous lithium ion secondary battery of this disclosure, the anode includes an anode current collector, and part of a surface of the anode current collector, the part being in contact with the aqueous electrolyte solution, is formed of a material that is mainly constituted of at least one selected from the group consisting of Al, Ti, Pb, Zn, Sn, Mg, Zr, and In.

Advantageous Effects

According to new findings of the inventor of the present application, an aqueous electrolyte solution on a surface of an anode is easy to be electrolyzed especially on a portion of the surface where overvoltage is much affected, that is, on a portion of a high work function. Thus, electrolysis of an aqueous electrolyte solution is expected to be able to be suppressed by reducing a portion of a high work function on a surface of an anode as much as possible.

One feature of the aqueous electrolyte solution of this disclosure is to contain a specific metal cation in addition to a lithium ion and an imide based anion. Here, all metals that may form this specific metal cation have low work functions. In addition, this specific metal cation may be electrodeposited on a surface of an anode when, for example, a battery is charged/discharged. That is, when the aqueous electrolyte solution of this disclosure is used for an aqueous lithium ion secondary battery, a portion of a surface of an anode where a work function is high can be coated with a metal whose work function is low, which makes it possible to suppress direct contact of the aqueous electrolyte solution and the portion on the surface of the anode where a work function is high. Whereby, electrolysis of the aqueous electrolyte solution is suppressed, to obtain an aqueous lithium ion secondary battery of good cycle characteristics.

BRIEF DESCRIPTION OF DRAWINGS

FIGS. 2A, 2B, 2C, 2D, 2E, and 2F show cycle characteristics of evaluation cells according to Examples 1, 2, 3, 4, and 5 and Comparative Example 1: FIG. 2A corresponds to Comparative Example 1, and FIGS. 2B, 2C, 2D, 2E, and 2F correspond to Examples 1, 2, 3, 4, and 5;

FIGS. 4A, 4B, and 4C show cycle characteristics of evaluation cells when the concentration of a hafnium ion in an aqueous electrolyte solution was changed: FIG. 4A corresponds to Example 4 (concentration: 0.01 mass %), FIG. 4B corresponds to Example 10 (concentration: 0.05 mass %), and FIG. 4C corresponds to Example 11 (concentration: 0.1 mass %);

FIG. 5A corresponds to Example 3 (concentration: 0.01 mass %), FIG. 5B corresponds to Example 12 (concentration: 0.05 mass %), and FIG. 5C corresponds to Example 13 (concentration: 0.1 mass %);

FIG. 6A corresponds to Example 5 (concentration: 0.01 mass %), FIG. 6B corresponds to Example 14 (concentration: 0.05 mass %), and FIG. 6C corresponds to Example 15 (concentration: 0.1 mass %)

DETAILED DESCRIPTION OF EMBODIMENTS

1. Aqueous Electrolyte Solution

Figure 1:
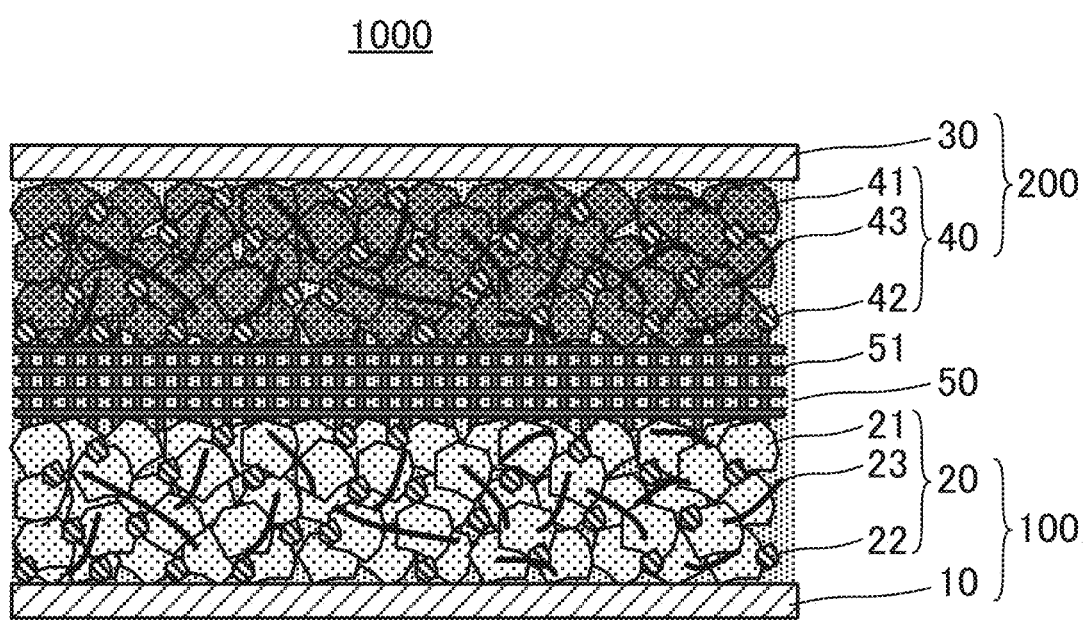
FIG. 1 is an explanatory schematic view of an aqueous lithium ion secondary battery 1000.
Figure 3A:
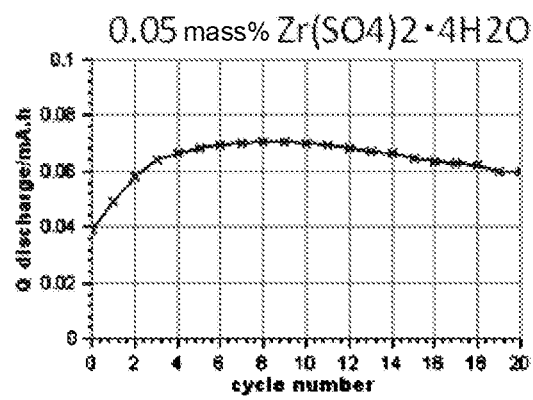
FIGS. 3A, 3B, 3C, and 3D show cycle characteristics of evaluation cells according to Examples 6, 7, 8 and 9, respectively.
Figure 3B:
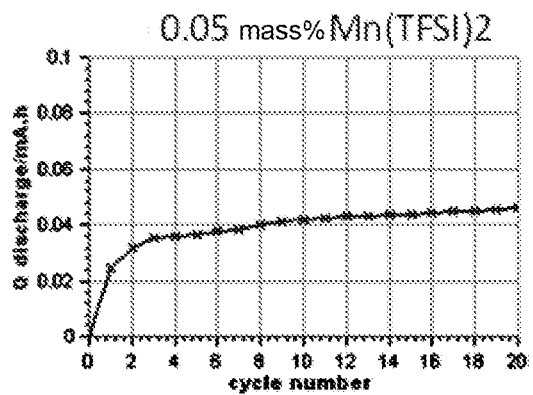
Figure 3C:
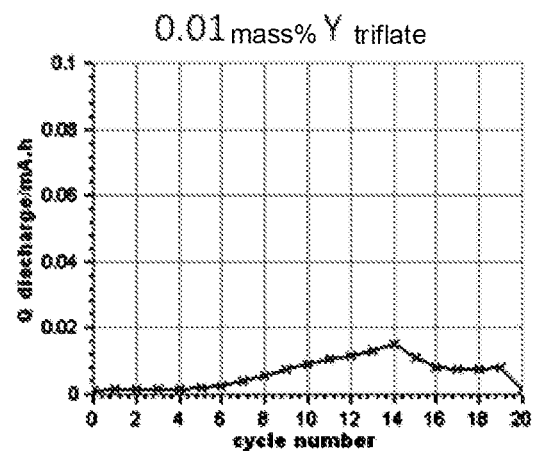
Figure 3D:
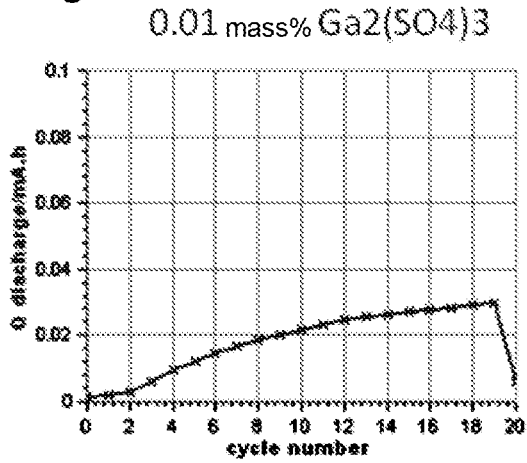

The aqueous electrolyte solution of this disclosure is an aqueous electrolyte solution that is used for an aqueous lithium ion secondary battery. A feature of the aqueous electrolyte solution is to include water; a lithium ion; at least one imide based anion selected from a TFSI anion and a FSI anion; and at least one metal cation selected from an aluminum ion, a titanium ion, a manganese ion, a zinc ion, a gallium ion, a yttrium ion, a zirconium ion, an indium ion, a lanthanum ion, a cerium ion, a neodymium ion, and a hafnium ion, wherein pH of the aqueous electrolyte solution is 3 to 12, and a content of the metal cation is more than 0 mol and no more than 0.01 mol per kilogram of the aqueous electrolyte solution.

1.1. pH pH of the aqueous electrolyte solution of this disclosure is 3 to 12. In some embodiments, the lower limit of pH is no less than 4 or no less than 6; and the upper limit thereof is no more than 10 or no more than 8. pH of 3 to 12 of the aqueous electrolyte solution containing a lithium ion and an imide based anion may sufficiently enlarge potential windows of the aqueous electrolyte solution on both the oxidation and reduction sides.

1.2. Solvent

The aqueous electrolyte solution of this disclosure contains water as a solvent. Solvent contains water as the main constituent. That is, in some embodiments no less than 50 mol %, no less than 70 mol %, no less than 90 mol %, or even no less than 95 mol % is water on the basis of the total mass of the solvent that is a constituent of the electrolyte solution (100 mol %). On the other hand, the upper limit of water in the solvent is not specifically limited. The solvent may be constituted of water only.

The solvent may contain (a) solvent(s) other than water in addition to water as far as the problem can be solved, in view of, for example, forming, SEI (Solid Electrolyte Interphase) over surfaces of active materials. Examples of (a) solvent(s) other than water include at least one organic solvent selected from an ether, a carbonate, a nitrile, an alcohol, a ketone, an amine, an amide, a sulfur compound, and a hydrocarbon. In some embodiments, no more than 50 mol %, no more than 30 mol %, no more than 10 mol %, or even no more than 5 mol % is (a) solvent(s) other than water on the basis of the total mass of the solvent that is a constituent of the electrolyte solution (100 mol %).

1.3. Electrolyte

The aqueous electrolyte solution of this disclosure contains an electrolyte. An electrolyte usually dissolves in an aqueous electrolyte solution, to dissociate into a cation and an anion.

1.3.1. Cation

The aqueous electrolyte solution of this disclosure contains a lithium ion as a cation. In some embodiments, the aqueous electrolyte solution contains no less than 1 mol of a lithium ion per kilogram of water, no less than 5 mol, no less than 7.5 mol, or even no less than 10 mol. The upper limit is not specifically limited, and for example, is no more than 25 mol in some embodiments. As the concentration of a lithium ion is high together with a TFSI anion and a FSI anion described later, the potential window of the aqueous electrolyte solution on the reduction side tends to expand.

The aqueous electrolyte solution of this disclosure contains the metal cation specified as described above. All the metals that may form the metal cation have low work functions. In addition, electrodeposition of the metal cation makes it possible to cover a portion of a high work function on a surface of an anode when, for example, the battery is charged/discharged. That is, when the aqueous electrolyte solution of this disclosure is used in the aqueous lithium ion secondary battery, direct contact of the portion of a high work function on the surface of the anode (such as a local portion on a surface of an anode active material where a work function is high, a surface of a conductive material formed of a material of a high work function, and/or a surface of an anode current collector formed of a material of a high work function) and the aqueous electrolyte solution can be suppressed when, for example, the battery is charged/discharged. Whereby, electrolysis of the aqueous electrolyte solution is suppressed, to obtain the aqueous lithium ion secondary battery of good cycle characteristics. As far as the inventor of present application is confirmed, when the concentration of the metal cation specified as described above in the aqueous electrolyte solution is within a predetermined range, the effect of suppressing electrolysis of the aqueous electrolyte solution on the surface of the anode is more outstanding. That is, in the aqueous electrolyte solution of this disclosure, it is important to contain more than 0 mol and no more than 0.01 mol of the metal cation per kilogram of the aqueous electrolyte solution. In some embodiments, the lower limit is no less than 0.00001 mol, no less than 0.00005 mol, or even no less than 0.0001 mol; and the upper limit is no more than 0.005 mol, or even no more than 0.003 mol. When the concentration of the metal cation is more than 0 mol and no more than 0.01 mol per kilogram of the aqueous electrolyte solution, electrodeposition, or deposition due to a local increase of pH in the vicinity of the electrode which accompanies formation of hydrogen in reductive decomposition of water which is a side reaction makes it possible to cover the surface of the anode in a charge reaction, especially the portion of a high work function thereof with the constituent of the metal cation, in the form of metal or a hydroxide, to suppress a reductive decomposition reaction of water on this deposited portion. When the concentration of the metal cation is higher than 0.01 mol, a deposition reaction excessively progresses, to cover most of the surface of the active material, to deteriorate ion conductivity on the surface of the anode, which might lead to a deteriorated charge/discharge reaction activity of the battery.

In view of the mechanism and effect as described above, it is believed that in an aqueous electrolyte solution, the same effect is exerted when (1) a cation formed of a metal of a low work function (2) which may be electrodeposited on a surface of an anode under a condition where electrolysis of the aqueous electrolyte solution is concerned about is added. For example, it is believed to be effective to dissolve a cation formed of a metal whose work function is no more than 4.5 eV, no more than 4.4 eV, or even no more than 4.33 eV in an aqueous electrolyte solution. The lower limit of the work function is not specifically limited, and for example is no less than 2.5 eV.

As far as the inventor of the present application is confirmed, the effect of suppressing electrolysis of the aqueous electrolyte solution on the surface of the anode is more outstandingly exerted when at least one metal cation selected from an aluminum ion, a titanium ion, a manganese ion, a zinc ion, a gallium ion, a yttrium ion, a zirconium ion, an indium ion, a lanthanum ion, a cerium ion, a neodymium ion, and a hafnium ion is employed among metal cations that satisfy the requirements (1) and (2). Among them, at least one metal cation selected from a titanium ion, a zirconium ion, and a hafnium ion, which are elements of the fourth group in the periodic table, may be employed, and a hafnium ion, which is stably soluble in an aqueous solution may be employed. When the metal cation is an element of the fourth group in the periodic table (especially a hafnium ion), a great effect is exerted even if the amount of adding the metal cation to the aqueous electrolyte solution is slightly small.

In contrast, as far as the inventor of the present application is confirmed, when at least one selected from a yttrium ion and lanthanoid ions (lanthanum ion, a cerium ion, and a neodymium ion), which are elements of the third group in the periodic table, is employed for the metal cation, cycle characteristics of the battery are a little different from the cases where other metal cations are employed. Specifically, when at least one selected from a cerium ion and a neodymium ion is employed, cycle characteristics of the battery are apparently different. That is, when the aqueous lithium ion secondary battery is made using the aqueous electrolyte solution containing at least one of them, there is a case where a discharge capacity starts to increase in the middle of charge/discharge cycles. Common points of a yttrium ion and lanthanoid ions are: they are electrodeposited on a surface of an anode at potentials baser than other metal cations; and they are unstable in water. That is, it is believed that while not soon deposited on a surface of an anode at the initial stage of charge/discharge cycles, a yttrium ion and lanthanoid ions are underpotentially deposited on a portion of a high work function on a surface of an anode gradually following repeated charge/discharge cycles, and deposited yttrium and lanthanoids are gradually stabilized on the portion of a high work function, to gradually suppress contact of an aqueous electrolyte solution and the portion of a high work function on the surface of the anode. According to findings of the inventor of the present application, when especially a cerium ion or a neodymium ion is employed for the metal cation, the content of the metal cation is no less than 0.0001 mol per kilogram of the aqueous electrolyte solution, or even no less than 0.0008 mol. The upper limit is no more than 0.002 mol, or even no more than 0.001 mol.

1.3.2. Anion

The aqueous electrolyte solution of this disclosure contains a TFSI anion and/or a FSI anion as an anion. In some embodiments, the aqueous electrolyte solution contains no less than 1 mol of a TFSI anion and/or a FSI anion per kilogram of water, no less than 5 mol, no less than 7.5 mol, or even no less than 10 mol. The upper limit is not specifically limited, and for example, is no more than 25 mol. As the concentration of a TFSI anion and/or a FSI anion is high together with a lithium ion described above, the potential window of the aqueous electrolyte solution on the reduction side tends to expand.

1.4. Other Constituents

The aqueous electrolyte solution of this disclosure may contain (an)other electrolyte(s). Examples thereof include $LiPF_6$, $LiBF_4$, $Li_2SO_4$, and $LiNO_3$. In some embodiments, the content of (an)other electrolyte(s) is no more than 50 mol %, no more than 30 mol %, or even no more than 10 mol %, on the basis of the total mass of the electrolyte that is contained (dissolves) in the electrolyte solution (100 mol %).

The aqueous electrolyte solution of this disclosure may contain (an)other constituent(s) in addition to the solvent and electrolyte(s) described above. Examples thereof include cations other than a lithium ion and the metal cation (such as alkali metal ions, and alkaline earth metal ions). An anion other than a TFSI anion and a FSI anion (such as a sulfate ion) may be contained as well. Further, acid, a hydroxide, etc. for adjusting pH of the aqueous electrolyte solution may be contained.

2. Aqueous Lithium Ion Secondary Battery

FIG. 1 schematically shows the structure of an aqueous lithium ion secondary battery 1000. As shown in FIG. 1, the aqueous lithium ion secondary battery 1000 includes a cathode 100, an anode 200, and an aqueous electrolyte solution 50. Here, one feature of the aqueous lithium ion secondary battery 1000 is to include the aqueous electrolyte solution of this disclosure as the aqueous electrolyte solution 50.

2.1. Cathode

Any one known as a cathode for an aqueous lithium ion secondary battery can be employed for the cathode 100. Specifically, in some embodiments, the cathode 100 includes a cathode current collector 10, and includes a cathode active material layer 20 containing a cathode active material 21 and being in contact with the cathode current collector 10.

2.1.1. Cathode Current Collector

A known metal that can be used as a cathode current collector of an aqueous lithium ion secondary battery can be used for the cathode current collector 10. Examples thereof include a metallic material containing at least one element selected from the group consisting of Ni, Al, V, Au, Pt, Mg, Fe, Ti, Co, Cr and Zn. The shape of the cathode current collector 10 is not specifically restricted, and may be any such as foil, mesh, and a porous form. The cathode current collector 10 may be one, on a surface of a base material of which a metal as described above is deposited, or the surface of the base material of which is plated with a metal as described above.

2.1.2. Cathode Active Material Layer

The cathode active material layer 20 contains the cathode active material 21. The cathode active material layer 20 may contain a conductive additive 22 and a binder 23 in addition to the cathode active material 21.

Any cathode active material for an aqueous lithium ion secondary battery can be employed for the cathode active material 21. Needless to say, the cathode active material 21 has a potential higher than that of an anode active material 41 described later, and is properly selected in view of potential window of the aqueous electrolyte solution 50. For example, a cathode active material containing a Li element can be employed, specifically, an oxide, a polyanion, or the like containing a Li element, which is more specifically lithium cobaltate ($LiCoO_2$); lithium nickelate ($LiNiO_2$); lithium manganate ($LiMn_2O_4$); $LiNi_{1/3}Mn_{1/3}Co_{1/3}O_2$; a different kind element substituent Li—Mn spinel represented by $Li_{1+x}Mn_{2-x-y}M_yO_4$ (M is at least one selected from Al, Mg, Co, Fe, Ni and Zn); a lithium metal phosphate ($LiMPO_4$, M is at least one selected from Fe, Mn, Co and Ni); or the like. Or, lithium titanate ($Li_xTiO_y$), $TiO_2$, $LiTi_2(PO_4)_3$, sulfur (S), or the like which shows a nobler charge/discharge potential compared to the anode active material described later can be used as well. Specifically, a cathode active material containing a Mn element in addition to a Li element can be employed. A cathode active material having a spinel structure such as $LiMn_2O_4$ and $Li_{1+x}Mn_{2-x-y}Ni_yO_4$ can be employed. Since the oxidation potential of a potential window of the aqueous electrolyte solution 50 may be approximately no less than 5.0 V (vs. Li/Li+), a cathode active material of a high potential which contains a Mn element in addition to a Li element can be also used. One cathode active material may be used individually, or two or more cathode active materials may be mixed to be used as the cathode active material 21.

The shape of the cathode active material 21 is not specifically restricted. An example thereof is a particulate shape. When the cathode active material 21 is in the form of a particle, the primary particle size thereof is 1 nm to 100 μm in some embodiments. The lower limit is no less than 5 nm, no less than 10 nm, or even no less than 50 nm; and the upper limit is no more than 30 μm, or even no more than 10 μm in some embodiments. Primary particles of the cathode active material 21 one another may assemble to form a secondary particle. In this case, the secondary particle size is not specifically restricted, but is usually 0.5 μm to 50 μm. In some embodiments, the lower limit is no less than 1 μm, and the upper limit is no more than 20 μm. The particle sizes of the cathode active material 21 within these ranges make it possible to obtain the cathode active material layer 20 further superior in ion conductivity and electron conductivity.

The amount of the cathode active material 21 contained in the cathode active material layer 20 is not specifically restricted. For example, on the basis of the whole of the cathode active material layer 20 (100 mass %), the content of the cathode active material 21 is no less than 20 mass %, no less than 40 mass %, no less than 60 mass %, or even no less than 70 mass % in some embodiments. The upper limit is not specifically restricted, but is no more than 99 mass %, no more than 97 mass %, or even no more than 95 mass % in some embodiments. The content of the cathode active material 21 within this range makes it possible to obtain the cathode active material layer 20 further superior in ion conductivity and electron conductivity.

The cathode active material layer 20 may contain the conductive additive 22 and the binder 23 in addition to the cathode active material 21. The conductive additive 22 and the binder 23 are not specifically limited.

Any conductive additive used in an aqueous lithium ion secondary battery can be employed for the conductive additive 22. Specific examples thereof include carbon materials. Specifically, a carbon material selected from Ketjenblack (KB), vapor grown carbon fiber (VGCF), acetylene black (AB), carbon nanotubes (CNT), a carbon nanofiber (CNF), carbon black, coke, and graphite may be employed. Or, a metallic material that can bear an environment where the battery is used may be used. One conductive additive may be used individually, or two or more conductive additives may be mixed to be used as the conductive additive 22. Any shape such as powder and fiber can be employed for the conductive additive 22. The amount of the conductive additive 22 contained in the cathode active material layer 20 is not specifically restricted. For example, the content of the conductive additive 22 is no less than 0.1 mass %, no less than 0.5 mass %, or even no less than 1 mass %, on the basis of the whole of the cathode active material layer 20 (100 mass %) in some embodiments. The upper limit is not specifically restricted, and is no more than 50 mass %, no more than 30 mass %, or even no more than 10 mass % in some embodiments. The content of the conductive additive 22 within this range makes it possible to obtain the cathode active material layer 20 further superior in ion conductivity and electron conductivity.

Any binder used in an aqueous lithium ion secondary battery can be employed for the binder 23. Examples thereof include styrene-butadiene rubber (SBR), carboxymethyl cellulose (CMC), acrylonitrile-butadiene rubber (ABR), butadiene rubber (BR), polyvinylidene fluoride (PVDF), and polytetrafluoroethylene (PTFE). One binder may be used individually, or two or more binders may be mixed to be used as the binder 23. The amount of the binder 23 contained in the cathode active material layer 20 is not specifically restricted. For example, the content of the binder 23 is no less than 0.1 mass %, no less than 0.5 mass %, or even no less than 1 mass %, on the basis of the whole of the cathode active material layer 20 (100 mass %) in some embodiments. The upper limit is not specifically restricted, and is no more than 50 mass %, no more than 30 mass %, or even no more than 10 mass % in some embodiments. The content of the binder 23 within this range makes it possible to properly bind the cathode active material 21 etc., and to obtain the cathode active material layer 20 further superior in ion conductivity and electron conductivity.

The thickness of the cathode active material layer 20 is not specifically restricted, and for example, is 0.1 μm to 1 mm, or even 1 μm to 100 μm in some embodiments.

2.2. Anode

Any one known as an anode for an aqueous lithium ion secondary battery can be employed as the anode 200. Specifically, the anode 200 may include an anode current collector 30, and may include an anode active material layer 40 containing the anode active material 41, and being in contact with the anode current collector 30.

2.2.1. Anode Current Collector

A known metal that can be used as an anode current collector of an aqueous lithium ion secondary battery can be used as the anode current collector 30. Examples thereof include a metallic material containing at least one element selected from the group consisting of Cu, Ni, Al, V, Au, Pt, Mg, Fe, Ti, Co, Cr, Zn, Ge and In. Specifically, part of a surface of the anode current collector 30 which is in contact with the aqueous electrolyte solution 50 may be formed of a material whose main constituent is at least one selected from the group consisting of Al, Ti, Pb, Zn, Sn, Mg, Zr and In, may be formed of a material whose main constituent is at least one selected from the group consisting of Ti, Pb, Zn, Sn, Mg, Zr and In, or even may be formed of a material whose main constituent is Ti. All these materials have low work functions, and if they are in contact with the aqueous electrolyte solution, the aqueous electrolyte solution is difficult to be electrolyzed. The work functions of these materials are equivalent to those of metal cations as described above, which makes it possible to suppress electrodeposition of the metal cation on the surface of the anode current collector 30, and to preferentially electrodeposit the metal cation on another portion of a high work function, which is on the surface of the anode. That is, a great improving effect is expected even if the amount of addition of the metal cation contained in the aqueous electrolyte solution is slightly small. Thereby, cycle stability as a secondary battery is further improved. The shape of the anode current collector 30 is not specifically restricted, and may be any form such as foil, mesh, and a porous form. The anode current collector 30 may be one, a surface of a base material of which is plated with a metal as described above, or on the surface of the base material of which a metal as described above is deposited.

2.2.2. Anode Active Material Layer

The anode active material layer 40 contains the anode active material 41. The anode active material layer 40 may contain a conductive additive 42 and a binder 43 in addition to the anode active material 41.

The anode active material 41 may be selected in view of potential windows of the aqueous electrolyte solution. Examples thereof include lithium-transition metal complex oxides; titanium oxide; metallic sulfides such as $Mo_6S_8$; elemental sulfur; $LiTi_2(PO_4)_3$; and NASICON-type compounds. In some embodiments, at least one titanium-containing oxide selected from lithium titanate and titanium oxide is contained. Among them, $Li_4Ti_5O_{12}$ (LTO) allows a good SEI to be easily formed. Charge/discharge of LTO in the aqueous solution, which is conventionally difficult, can be stably carried out in the aqueous lithium ion secondary battery 1000 as well.

The shape of the anode active material 41 is not specifically restricted. For example, a particulate shape can be employed. When the anode active material 41 is in the form of a particle, the primary particle size may be 1 nm to 100 μm. In some embodiments, the lower limit thereof is no less than 10 nm, no less than 50 nm, or even no less than 100 nm; and the upper limit is no more than 30 μm, or even no more than 10 μm. Primary particles of the anode active material 41 one another may assemble to form a secondary particle. In this case, the secondary particle size is not specifically restricted, and is usually 0.5 μm to 100 μm. In some embodiments, the lower limit is no less than 1 μm, and the upper limit is no more than 20 μm. The particle sizes of the anode active material 41 within these ranges make it possible to obtain the anode active material layer 40 further superior in ion conductivity and electron conductivity.

The amount of the anode active material 41 contained in the anode active material layer 40 is not specifically restricted. For example, on the basis of the whole of the anode active material layer 40 (100 mass %), the content of the anode active material 41 is no less than 20 mass %, no less than 40 mass %, no less than 60 mass %, or even no less than 70 mass % in some embodiments. The upper limit is not specifically restricted, and is no more than 99 mass %, no more than 97 mass %, or even no more than 95 mass % in some embodiments. The content of the anode active material 41 within this range makes it possible to obtain the anode active material layer 40 further superior in ion conductivity and electron conductivity.

The anode active material layer 40 contains the anode active material 41 and the conductive additive 42 in some embodiments. In some embodiments, the anode active material layer 40 further contains the binder 43. The conductive additive 42 and the binder 43 are not specifically limited. For example, the conductive additive 42 and the binder 43 may be properly selected from the examples of the conductive additive 22 and the binder 23, to be used. In some embodiments, the conductive additive 42 is formed of a material whose work function is higher than a metal constituting the metal cation contained in the aqueous electrolyte solution 50. In some embodiments, the conductive additive 42 is formed of a carbon material. When the conductive additive 42 of a high work function as described above and an aqueous electrolyte solution are directly contacted, electrolysis of this aqueous electrolyte solution is concerned. However, in the aqueous electrolyte solution 50 of this disclosure, the specified metal cation is contained as described above, and a surface of the conductive additive 42 may be covered with a metal of a low work function when, for example, the battery is charged/discharged. That is, when a carbon material is used for the conductive additive 42, electrolysis of the aqueous electrolyte solution on the surface of the conductive additive 42 can be suppressed as well. The amount of the conductive additive 42 contained in the anode active material layer 40 is not specifically restricted. For example, in some embodiments, the content of the conductive additive 42 is no less than 10 mass %, no less than 30 mass %, or even no less than 50 mass %, on the basis of the whole of the anode active material layer 40 (100 mass %). The upper limit is not specifically restricted, and in some embodiments is no more than 90 mass %, no more than 70 mass %, or even no more than 50 mass %. The content of the conductive additive 42 within this range makes it possible to obtain the anode active material layer 40 further superior in ion conductivity and electron conductivity. The amount of the binder 43 contained in the anode active material layer 40 is not specifically restricted. For example, in some embodiments, the content of the binder 43 is no less than 1 mass %, no less than 3 mass %, or even no less than 5 mass %, on the basis of the whole of the anode active material layer 40 (100 mass %). The upper limit is not specifically restricted, and in some embodiments is no more than 90 mass %, no more than 70 mass %, or even no more than 50 mass %. The content of the binder 43 within this range makes it possible to properly bind the anode active material 41 etc., and to obtain the anode active material layer 40 further superior in ion conductivity and electron conductivity.

The thickness of the anode active material layer 40 is not specifically restricted, and for example, is in some embodiments 0.1 μm to 1 mm, or even 1 μm to 100 μm 2.3. Aqueous Electrolyte Solution An electrolyte solution exists inside an anode active material, layer, inside a cathode active material layer, and between the anode and cathode active material layers in a lithium ion secondary battery of an electrolyte solution system, which secures lithium ion conductivity between the anode and cathode active material layers. This manner is also employed for the battery 1000. Specifically, in the battery 1000, a separator 51 is provided between the cathode active material layer 20 and the anode active material layer 40. The separator 51, the cathode active material layer 20, and the anode active material layer 40 are immersed in the aqueous electrolyte solution 50. The aqueous electrolyte solution 50 penetrates inside the cathode active material layer 20 and the anode active material layer 40.

The aqueous electrolyte solution 50 is the aqueous electrolyte solution of this disclosure. Detailed description thereof is omitted here.

2.4. Other Components

In the aqueous lithium ion secondary battery 1000, the separator 51 is provided between the anode active material layer 20 and the cathode active material layer 40. A separator used in a conventional aqueous electrolyte solution battery (such as NiMH, and Zn-Air battery) is employed for the separator 51 in some embodiments. For example, a hydrophilic one such as nonwoven fabric made of cellulose can be used. The thickness of the separator 51 is not specifically restricted. For example, one having the thickness of 5 μm to 1 mm can be used.

In the aqueous lithium ion secondary battery 1000, terminals, a battery case, etc. are provided in addition to the components as described above. Since the other components are known to the person skilled in the art who refers to the present application, description thereof is omitted here.

The aqueous lithium ion secondary battery of this disclosure can be expressed as follows as well: that is, a feature of the aqueous lithium ion secondary battery is to include a cathode, an anode, and an aqueous electrolyte solution, wherein the aqueous electrolyte solution includes a Li ion, at least one imide based anion selected from a TFSI anion and a FSI anion, and a metal cation, the metal cation is a cation of a metal whose work function is lower than a material that is a constituent of the anode and that has the highest work function among the other constituents of the anode, and the cation is electrodeposited on a surface of the anode when the battery is charged/discharged. In this case, the cathode and the anode are the cathode 100 and the anode 200, and the aqueous electrolyte solution is the aqueous electrolyte solution 50 in some embodiments. Such a battery also makes it possible to suppress electrolysis of the aqueous electrolyte solution on the surface of the anode.

3. Method for Producing Aqueous Electrolyte Solution

The aqueous electrolyte solution can be produced by, for example, mixing water, LiTFSI (lithium bis(trifluoromethanesulfonyl)imide) and/or LiFSI (lithium bis(fluorosulfonyl)imide), and a metal cation source. Here, the metal cation source has only to dissociate into an anion and the specified metal cation when dissolving in water. Examples of an anion that constitutes the metal cation source include a triflate anion (trifluoromethanesulfonate anion) and a sulfate ion.

The means for mixing water, LiTFSI and/or LiFSI, and the metal cation source when the aqueous electrolyte solution is produced is not specifically limited. A known mixing means can be employed. The order of water, LiTFSI and/or LiFSI, and the metal cation source to be mixed is not specifically limited as well. Just filling a vessel with water, LiTFSI, and the metal cation source to be left to stand results in mixing with each other, to finally obtain the aqueous electrolyte solution 50. Or, a solution (A) is prepared by dissolving LiTFSI and/or LiFSI in water, and a solution (B) is prepared by dissolving the metal cation source in water. One may mix these solutions (A) and (B) to obtain the aqueous electrolyte solution 50.

4. Method for Producing Aqueous Lithium Ion Secondary Battery

The aqueous lithium ion secondary battery 1000 can be produced via, for example, a step of producing the aqueous electrolyte solution 50, a step of producing the cathode 100, a step of producing the anode 200, and a step of storing the produced aqueous electrolyte solution 50, cathode 100, and anode 200 into the battery case.

4.1. Producing Aqueous Electrolyte Solution

The step of producing the aqueous electrolyte solution 50 is as described already. Detailed description thereof is omitted here.

4.2. Producing Cathode

The step of producing the cathode may be the same as a known step. For example, the cathode active material etc. to form the cathode active material layer 20 are dispersed in solvent, to obtain a cathode mixture paste (slurry). Water or any organic solvent can be used as the solvent used in this case without specific restrictions. The surface of the cathode current collector 10 is coated with the cathode mixture paste (slurry) using a doctor blade or the like, and thereafter dried, to form the cathode active material layer 20 over the surface of the cathode current collector 10, to be the cathode 100. Electrostatic spray deposition, dip coating, spray coating, or the like can be employed as well as the coating method other than a doctor blade method.

4.3. Producing Anode

The step of producing the anode may be the same as a known step. For example, the anode active material etc. to form the anode active material layer 40 are dispersed in solvent, to obtain an anode mixture paste (slurry). Water or any organic solvent can be used as the solvent used in this case without specific restrictions. The surface of the anode current collector 30 is coated with the anode mixture paste (slurry) using a doctor blade or the like, and thereafter dried, to form the anode active material layer 40 over the surface of the anode current collector 30, to be the anode 200. Electrostatic spray deposition, dip coating, spray coating, or the like can be employed as well as the coating method other than a doctor blade method.

4.4. Storing in Battery Case

The produced aqueous electrolyte solution 50, cathode 100, and anode 200 are stored in the battery case, to be the aqueous lithium ion secondary battery 1000. For example, the separator 51 is sandwiched between the cathode 100 and the anode 200, to obtain a stack including the cathode current collector 10, the cathode active material layer 20, the separator 51, the anode active material layer 40, and the anode current collector 30 in this order. The stack is equipped with other members such as terminals if necessary. The stack is stored in the battery case, and the battery case is filled with the aqueous electrolyte solution 50. The stack and the electrolyte solution are sealed up in the battery case such that the stack is immersed in the aqueous electrolyte solution 50, to be the aqueous lithium ion secondary battery 1000.

5. Method for Suppressing Decomposition of Aqueous Electrolyte Solution on Surface of Anode The technique of this disclosure also has an aspect as a method for suppressing electrolysis of the aqueous electrolyte solution on the surface of the anode of the aqueous lithium ion secondary battery in addition to aspects of the aqueous electrolyte solution and the aqueous lithium ion secondary battery.

That is, the method is for suppressing electrolysis of an aqueous electrolyte solution on a surface of an anode of an aqueous lithium ion secondary battery having a feature of using a solution including a Li ion, at least one imide based anion selected from a TFSI anion and a FSI anion, and a metal cation as the aqueous electrolyte solution of the aqueous lithium ion secondary battery, using a cation of a metal whose work function is lower than a material that is a constituent of an anode of the aqueous lithium ion secondary battery and that has the highest work function among the other constituents of the anode as the metal cation, wherein the cation is electrodeposited on the surface of the anode when the battery is charged/discharged, and a portion of the surface of the anode whose work function is higher than the metal is covered with the metal of a lower work function, to suppress direct contact of the aqueous electrolyte solution and the portion of the surface of the anode whose work function is higher. In this case, the anode is the anode 200, and the aqueous electrolyte solution 50 is used as the aqueous electrolyte solution in some embodiments.

Alternatively, the method is for suppressing electrolysis of an aqueous electrolyte solution on a surface of an anode of an aqueous lithium ion secondary battery having a feature of, in the aqueous lithium ion secondary battery using an anode including at least one of an anode current collector and a conductive additive, using a solution including a Li ion, at least one imide based anion selected from a TFSI anion and a FSI anion, and a cation of a metal whose work function is lower than a material that is a constituent of the anode current collector and a material that is a constituent of the conductive additive as the aqueous electrolyte solution, wherein the cation is electrodeposited on (a) surface(s) of the anode current collector and/or the conductive additive when the battery is charged/discharged, to suppress direct contact of the aqueous electrolyte solution, and the anode current collector and/or the conductive additive. In this case, the anode is the anode 200, and the aqueous electrolyte solution 50 is used as the aqueous electrolyte solution as well in some embodiments.

EXAMPLES

1. Confirmation of Effect of Various Metal Cations
1.1. Producing Aqueous Electrolyte Solution Comparative Example 1

In 1 kg of pure water, 10 mol of LiTFSI was dissolved, to obtain an aqueous electrolyte solution according to Comparative Example 1.

Example 1

In 1 kg of pure water, 10 mol of LiTFSI was dissolved, to be a solution (A).

To the solution (A), 0.01 mass % of zinc trifluoromethanesulfonate (Zn triflate) was added, to obtain an aqueous electrolyte solution according to Example 1. That is, in the aqueous electrolyte solution of Example 1, the content of a zinc ion per kilogram of the aqueous electrolyte solution was 0.00028 mol.

Example 2

In 1 kg of pure water, 10 mol of LiTFSI was dissolved, to be the solution (A).

To the solution (A), 0.01 mass % of indium trifluoromethanesulfonate (In triflate) was added, to obtain an aqueous electrolyte solution according to Example 2. That is, in the aqueous electrolyte solution of Example 2, the content of an indium ion per kilogram of the aqueous electrolyte solution was 0.00018 mol.

Example 3

In 1 kg of pure water, 10 mol of LiTFSI was dissolved, to be the solution (A).

To the solution (A), 0.01 mass % of cerium trifluoromethanesulfonate (Ce triflate) was added, to obtain an aqueous electrolyte solution according to Example 3. That is, in the aqueous electrolyte solution of Example 3, the content of a cerium ion per kilogram of the aqueous electrolyte solution was 0.00017 mol.

Example 4

In 1 kg of pure water, 10 mol of LiTFSI was dissolved, to be the solution (A).

To the solution (A), 0.01 mass % of hafnium trifluoromethanesulfonate (Hf triflate) was added, to obtain an aqueous electrolyte solution according to Example 4. That is, in the aqueous electrolyte solution of Example 4, the content of a hafnium ion per kilogram of the aqueous electrolyte solution was 0.00013 mol.

Example 5

In 1 kg of pure water, 10 mol of LiTFSI was dissolved, to be the solution (A).

To the solution (A), 0.01 mass % of neodymium trifluoromethanesulfonate (Nd triflate) was added, to obtain an aqueous electrolyte solution according to Example 5. That is, in the aqueous electrolyte solution of Example 5, the content of a neodymium ion per kilogram of the aqueous electrolyte solution was 0.00017 mol.

Example 6

In 1 kg of pure water, 10 mol of LiTFSI was dissolved, to be the solution (A).

To the solution (A), 0.05 mass % of zirconium sulfate tetrahydrate ($Zr(SO_4)_2 \cdot 4H_2O$) was added, to obtain an aqueous electrolyte solution according to Example 6. That is, in the aqueous electrolyte solution of Example 6, the content of a zirconium ion per kilogram of the aqueous electrolyte solution was 0.0014 mol.

Example 7

In 1 kg of pure water, 10 mol of LiTFSI was dissolved, to be the solution (A).

To the solution (A), 0.05 mass % of Mn(TFSI)$_2$ was added, to obtain an aqueous electrolyte solution according to Example 7. That is, in the aqueous electrolyte solution of Example 7, the content of a manganese ion per kilogram of the aqueous electrolyte solution was 0.00081 mol.

Example 8

In 1 kg of pure water, 10 mol of LiTFSI was dissolved, to be the solution (A).

To the solution (A), 0.01 mass % of yttrium trifluoromethanesulfonate (Y triflate) was added, to obtain an aqueous electrolyte solution according to Example 8. That is, in the aqueous electrolyte solution of Example 8, the content of a yttrium ion per kilogram of the aqueous electrolyte solution was 0.00019 mol.

Example 9

In 1 kg of pure water, 10 mol of LiTFSI was dissolved, to be the solution (A).

To the solution (A), 0.01 mass % of gallium sulfate (Ga$_2$(SO$_4$)$_3$) was added, to obtain an aqueous electrolyte solution according to Example 9. That is, in the aqueous electrolyte solution of Example 9, the content of a gallium ion per kilogram of the aqueous electrolyte solution was 0.00046 mol.

1.2. Producing Aqueous Lithium Ion Secondary Battery 1.2.1. Producing Electrodes As active materials, Li$_4$Ti$_5$O$_{12}$ (LTO) was used for a working electrode (anode), and LiMn$_2$O$_4$ (LMO) was used for a counter electrode. Acetylene black was used for a conductive additive, and PVdF was used for binder. Titanium foil was used for both anode and cathode current collectors. First, after either active material, and the conductive additive were mixed in a mortar, PVdF was added thereto. The mass ratio of the active material, the conductive additive, and PVdF was: active material:conductive additive:PVdF=85:10:5. While the viscosity was confirmed, NMP was added thereto. After continued to be mixed in the mortar to be uniform, they were put into an ointment container, and mixed by means of a mixer (Thinky mixer (Awatori rentaro) manufactured by Thinky Corporation) at 3000 rpm for 10 minutes. Slurry obtained as described above was put on the titanium foil, to coat the foil by means of a doctor blade. Thereafter, the titanium foil was allowed to stand in a drying oven at 60° C. for a night, to dry solvent to be an electrode. The obtained electrode was punched out to have a diameter of 16 mm, and subjected to roll pressing so that its porosity was 40%. The same was applied to the other active material, to obtain another electrode. The weight of a layer of the active material on the LTO electrode side was such as to be 1.0 mg/cm$^2$, and that on the LMO electrode side was such as to be 14.4 mg/cm$^2$.

1.2.2. Assembly

The LTO electrode was used as a working electrode, and the LMO electrode was used as a counter electrode. They were assembled in an opposing cell whose opening diameter was 10 mm (distance between the electrode plates: approximately 9 mm). Ag/AgCl (Interchem Corporation (Intakemisya)) was used as a reference electrode. A cell was filled with approximately 2 cc of the aqueous electrolyte solution, to make an evaluation cell.

1.3. Evaluation Conditions

The following are devices and conditions used for evaluation:

(device)

electrochemical measuring device: VMP3 (manufactured by Bio-Logic Science Instruments SAS)

constant temperature oven: LU-124 (manufactured by Espec Corp.) (conditions)

constant current charge/discharge rate: 1.0 mA (10 C)

limited capacity of anode: 0.1 mAh cutting condition (charge): cut at a theoretical capacity of the anode+10%, or at an anode potential−1.6 V (vs. Ag/AgCl)

cutting condition (discharge): at an anode potential−1.0 V (vs. Ag/AgCl)

1.4. Evaluation Results

FIGS. 2A to 3D show cycle characteristics of the evaluation cells when the evaluation cells were produced using the aqueous electrolyte solutions. FIG. 2A corresponds to Comparative Example 1, FIGS. 2B to 2F correspond to Examples 1 to 5, and FIGS. 3A to 3D correspond to Examples 6 to 9. As is apparent from the results shown in FIGS. 2A to 3D, adding the metal cations to the aqueous electrolyte solutions outstandingly improved cycle characteristics of the batteries.

All the metal cations described above were formed of metals of low work functions. That is, it is believed that when the aqueous electrolyte solutions of Examples 1 to 9 were used, in the evaluation cells, the metal cations of low work functions were electrodeposited on portions of high work functions on surfaces of the anodes. It is believed that since titanium, whose work function is low (4.3 eV), was used for the anode current collectors in the Examples, portions of specifically high work functions on the surfaces of the anode active material (LTO), or a surface of acetylene black, which was the conductive additive, underwent an electrodeposition reaction. It is believed that as described above, making the batteries using the aqueous electrolyte solutions of Examples 1 to 9 made it possible to cover the portions of high work functions on the surfaces of the anodes with the metals of low work functions, to suppress reductive decomposition of the aqueous electrolyte solutions on the surfaces of the anodes.

2. Dependency on Concentration of Hafnium Ion

About the aqueous electrolyte solution containing a hafnium ion (FIG. 2E), which has a greatest effect among FIGS. 2A to 2F, the concentration of a hafnium ion in the aqueous electrolyte solution was changed, to confirm change in cycle characteristics of batteries.

2.1. Producing Aqueous Electrolyte Solution

Example 10

In 1 kg of pure water, 10 mol of LiTFSI was dissolved, to be the solution (A).

To the solution (A), 0.05 mass % of hafnium trifluoromethanesulfonate (Hf triflate) was added, to obtain an aqueous electrolyte solution according to Example 10. That is, in the aqueous electrolyte solution of Example 10, the content of a hafnium ion per kilogram of the aqueous electrolyte solution was 0.00065 mol.

Example 11

In 1 kg of pure water, 10 mol of LiTFSI was dissolved, to be the solution (A).

To the solution (A), 0.1 mass % of hafnium trifluoromethanesulfonate (Hf triflate) was added, to obtain an aqueous electrolyte solution according to Example 11. That is, in the aqueous electrolyte solution of Example 11, the content of a hafnium ion per kilogram of the aqueous electrolyte solution was 0.00129 mol.

2.2. Producing and Evaluating Aqueous Lithium Ion Secondary Battery

Evaluation cells were produced and cycle characteristics were confirmed in the same manner as in Example 4. The results are shown in FIGS. 4A to 4C. FIG. 4A corresponds to Example 4, FIG. 4B corresponds to Example 10, and FIG. 4C corresponds to Example 11. As is apparent from the results shown in FIGS. 4A to 4C, it is found that when the aqueous electrolyte solutions contained a hafnium ion, the evaluation cells kept their discharge capacities high, and their cycle characteristics were stabilized both in cases where the concentrations of a hafnium ion were low and high.

The standard electrode potential of hafnium is nobler than the charge/discharge potential of LTO. Therefore, electro deposition on the portion of a high work function of the anode (the main starting point of reductive decomposition of water) before a charge reaction of LTO was started made the work function on the surface of the anode equivalent to that of hafnium. Whereby, reductive decomposition of water is believed to have been suppressed, which made highly efficiently charge/discharge possible.

It is expected it can be confirmed that titanium and zirconium, which are in the same group as hafnium in the periodic table, have the same effect as well. Titanium and zirconium also have low work functions, and may be electrodeposited at potentials nobler than the charge/discharge potential of the anode. That is, it is believed that a titanium ion and/or a zirconium ion may be contained as the metal cation. This point is also apparent from the fact that the effect was confirmed in Example 6 (zirconium). It is noted that hafnium is believed to be superior to titanium and zirconium in solubility in an aqueous solution, and a slighter amount of hafnium is believed to bring about a greater effect than titanium and zirconium.

3. Dependency on Concentrations of Cerium Ion and Neodymium Ion

About the aqueous electrolyte solution containing a cerium ion or a neodymium ion (FIG. 2D or 2G), which showed specific behaviors among FIGS. 2A to 2F, the concentration of a cerium ion or a neodymium ion in the aqueous electrolyte solution was changed, to confirm change in cycle characteristics of batteries.

3.1. Producing Aqueous Electrolyte Solution

Example 12

In 1 kg of pure water, 10 mol of LiTFSI was dissolved, to be the solution (A).

To the solution (A), 0.05 mass % of cerium trifluoromethanesulfonate (Ce triflate) was added, to obtain an aqueous electrolyte solution according to Example 12. That is, in the aqueous electrolyte solution of Example 12, the content of a cerium ion per kilogram of the aqueous electrolyte solution was 0.00085 mol.

Example 13

In 1 kg of pure water, 10 mol of LiTFSI was dissolved, to be the solution (A).

To the solution (A), 0.1 mass % of cerium trifluoromethanesulfonate (Ce triflate) was added, to obtain an aqueous electrolyte solution according to Example 13. That is, in the aqueous electrolyte solution of Example 13, the content of a cerium ion per kilogram of the aqueous electrolyte solution was 0.0017 mol.

Example 14

In 1 kg of pure water, 10 mol of LiTFSI was dissolved, to be the solution (A).

To the solution (A), 0.05 mass % of neodymium trifluoromethanesulfonate (Nd triflate) was added, to obtain an aqueous electrolyte solution according to Example 14. That is, in the aqueous electrolyte solution of Example 14, the content of a neodymium ion per kilogram of the aqueous electrolyte solution was 0.00085 mol.

Example 15

In 1 kg of pure water, 10 mol of LiTFSI was dissolved, to be the solution (A).

To the solution (A), 0.1 mass % of neodymium trifluoromethanesulfonate (Nd triflate) was added, to obtain an aqueous electrolyte solution according, to Example 15. That is, in the aqueous electrolyte solution of Example 15, the content of a neodymium ion per kilogram of the aqueous electrolyte solution was 0.00169 mol.

3.2. Producing and Evaluating Aqueous Lithium Ion Secondary Battery

Figure 5A:
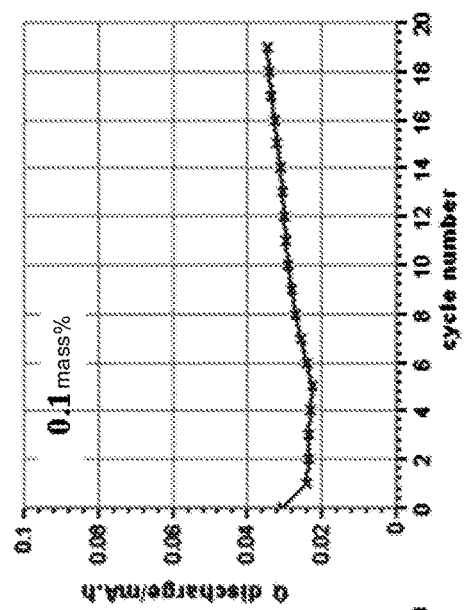
FIGS. 5A, 5B, and 5C show cycle characteristics of evaluation cells when the concentration of a cerium ion in the aqueous electrolyte solution was changed.
Figure 5B:
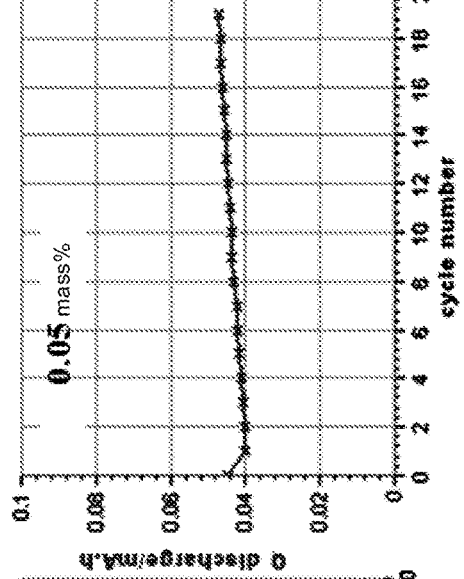
Figure 5C:
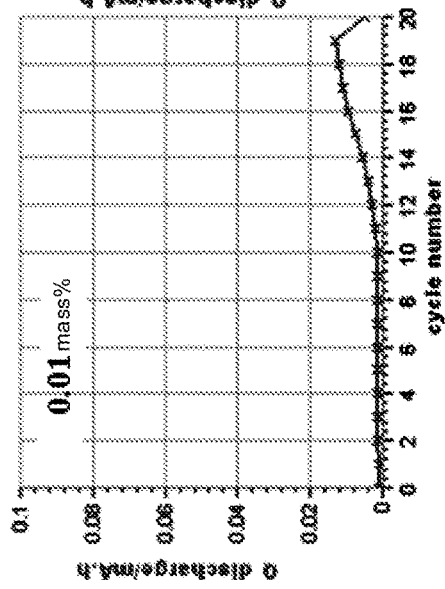
Figure 6A:
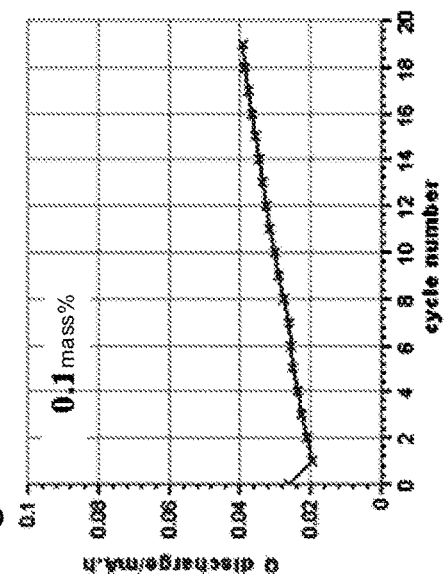
FIGS. 6A, 6B, and 6C show cycle characteristics of evaluation cells when the concentration of a neodymium ion in the aqueous electrolyte solution was changed.
Figure 6B:
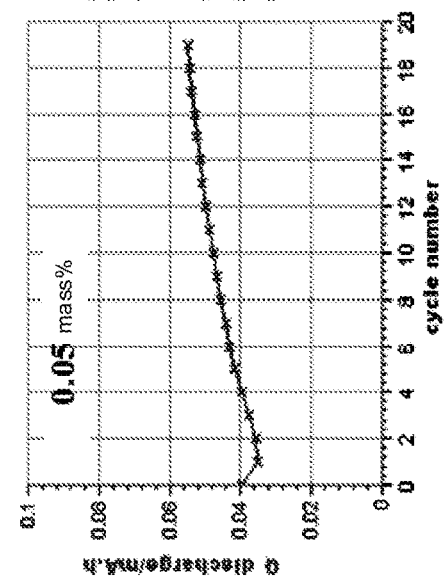
Figure 6C:
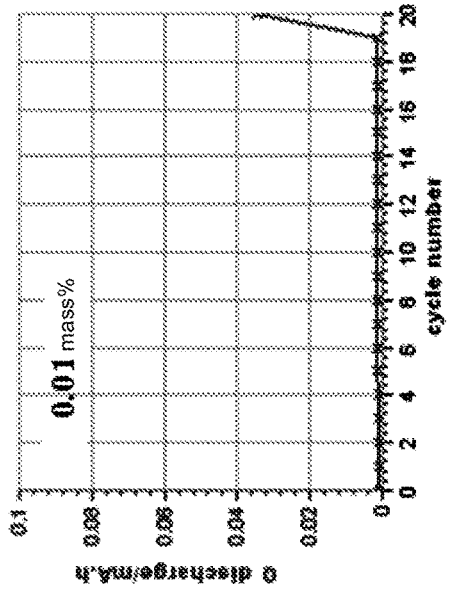

Evaluation cells were produced and cycle characteristics were confirmed in the same manner as in Examples 3 and 5. The results are shown in FIGS. 5A to 6C. FIG. 5A corresponds to Example 3, FIG. 5B corresponds to Example 12, FIG. 5C corresponds to Example 13, FIG. 6A corresponds to Example 5, FIG. 6B corresponds to Example 14, and FIG. 6C corresponds to Example 15. As is apparent from the results shown in FIGS. 5A to 6C, when the evaluation cells were made using the aqueous electrolyte solutions containing any of a cerium ion and a neodymium ion, the discharge capacities started to increase in the middle of charge/discharge cycles.

Common points of cerium and neodymium are: their standard electrode potentials are baser than LTO; and they are unstable in water. The reason why the effect of improving cycle characteristics was obtained seems to be as follows: that is, first, an element of a low work function tends to underpotentially deposit on a portion of a high work function, which is believed to have caused an electrodeposition reaction of a monoatomic layer at a potential nobler than the original electrodeposition potential. When a deposit according to the electrodeposition reaction was a single element, where the deposit seems to be eluted by reaction with water, the deposit is believed to have been stabilized on the portion of a high work function in the state of, for example, a metal hydroxide but not the element only due to the repeat of deposition and elution. Therefore, it is believed that as the charge/discharge cycle was repeated, the battery operation was gradually improved.

It is expected it can be confirmed that other lanthanoids (such as lanthanum) and yttrium, which are in the same group as cerium and neodymium in the periodic table, have the same effect as well. This point is also apparent from the fact that the effect was confirmed in Example 8 (yttrium). The work functions of lanthanoids and yttrium are low as well, and they may be electrodeposited at potentials nobler than the charge/discharge potential of the anodes.

4. Speculation on Indium Ion

As shown in FIG. 2C, when the aqueous electrolyte solution contained an indium ion, as the charge/discharge cycle was repeated, the battery operation was gradually improved as well. However, the standard electrode potential of indium is nobler than LTO, and indium is stable in water, unlike cerium etc. In view of this, it is speculated that the reaction activity of indium in electrodeposition was low, and deposition on the portion of a high work function on the surface of the anode gradually progressed.

It is expected it can be confirmed that aluminum and gallium, which are in the same group as indium in the periodic table, have the same effect as well. This point is also apparent from the fact that the effect was confirmed in Example 9 (gallium). The work functions of aluminum and gallium are low as well, and they may be electrodeposited at potentials nobler than the charge/discharge potential of the anodes. In view of solubility in water etc., indium may be employed rather than aluminum and gallium.

5. Evaluation when $TiO_2$ Anode was Used

As described above, it is believed that the metal cations are electrodeposited on portions of high work functions on the surfaces of anodes, which makes it possible to suppress reductive decomposition of aqueous electrolyte solutions on the surface of a conducting material. On the surfaces of anodes, portions of high work functions might be formed on not only the surface of an anode active material but also the surfaces of conductive additives and the surfaces of anode current collectors. In this point, the technique of this disclosure is believed to exert a desired effect even when an anode active material other than LTO is used. Hereinafter Examples where $TiO_2$ anodes were used will be shown.

5.1. Producing Electrolyte Solution

Comparative Example 2

An aqueous electrolyte solution according to Comparative Example 2 was obtained in the same manner as in Comparative Example 1.

Comparative Example 3

In 1 kg of pure water, 5 mol of LiTFSI was dissolved, to obtain an aqueous electrolyte solution according to Comparative Example 3.

Example 16

An aqueous electrolyte solution according to Example 16 (aqueous electrolyte solution containing a zinc ion) was obtained in the same manner as in Example 1.

5.2. Producing Aqueous Lithium Ion Secondary Battery 5.2.1. Producing Electrodes As active materials, $TiO_2$ was used for a working electrode (anode), and $LiMn_2O_4$ (LMO) was used for a counter electrode. Acetylene black was used for a conductive additive, and PVdF was used for binder. Titanium foil was used for both anode and cathode current collectors. First, after either active material and the conductive additive were mixed in a mortar, PVdF was added thereto. The mass ratio of the active material, the conductive additive, and PVdF was: active material:conductive additive:PVdF=85:10:5. While the viscosity was confirmed, NMP was added thereto. After continued to be mixed in the mortar to be uniform, they were put into an ointment container, and mixed by means of a mixer (Thinky mixer (Awatori rentaro) manufactured by Thinky Corporation) at 3000 rpm for 10 minutes. Slurry obtained as described above was put on the titanium foil, to coat the foil by means of a doctor blade. Thereafter, the titanium foil was allowed to stand in a drying oven at 60° C. for a night, to dry solvent to be an electrode. The obtained electrode was punched out to have a diameter of 16 mm, and subjected to roll pressing so that its porosity was 40%. The same was applied to the other active material, to obtain another electrode. The weight of a layer of the active material on the $TiO_2$ electrode side was such as to be 1.5 mg/cm$^2$, and that on the LMO electrode side was such as to be 14.4 mg/cm$^2$.

5.2.2. Assembly

The $TiO_2$ electrode was used as a working electrode, and the LMO electrode was used as a counter electrode. They were assembled in an opposing cell whose opening diameter was 10 mm (distance between the electrode plates: approximately 9 mm). Ag/AgCl (Interchem Corporation (Intakemisya)) was used as a reference electrode. A cell was filled with approximately 2 cc of the aqueous electrolyte solution, to make an evaluation cell.

5.3. Evaluation Conditions

The following are devices and conditions used for evaluation:
(device)
electrochemical measuring device: VMP3 (manufactured by Bio-Logic Science Instruments SAS)
constant temperature oven: LU-124 (manufactured by Espec Corp.)
(conditions)
constant current charge/discharge
rate: 0.015 mA (0.1 C)
limited capacity of anode: 0.15 mAh
cutting condition (charge): cut at a theoretical capacity of the anode+10%, or at an anode potential−1.6 V (vs. Ag/AgCl)
cutting condition (discharge): at an anode potential−1.0 V (vs. Ag/AgCl)

5.4. Evaluation Results

Figure 7A:
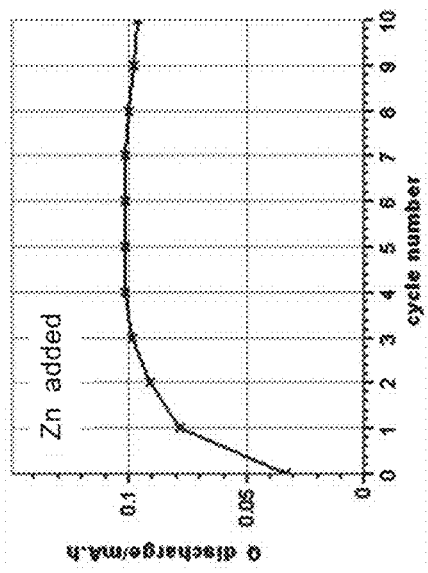
FIGS. 7A, 7B, and 7C show cycle characteristics of evaluation cells when an anode material was changed.
Figure 7B:
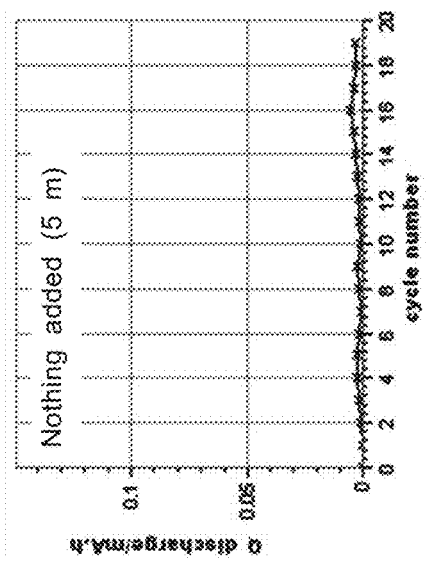
Figure 7C:
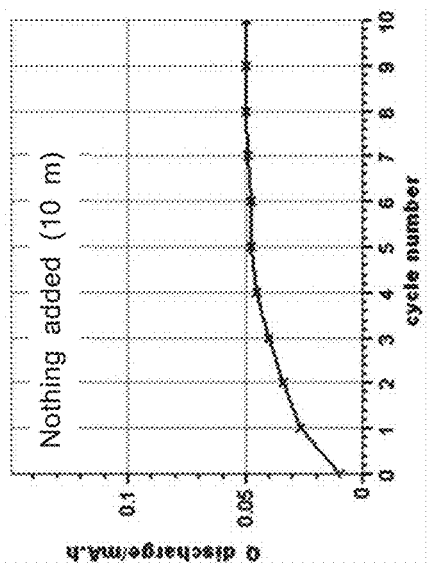

FIGS. 7A to 7C show evaluation results. FIG. 7A corresponds to Comparative Example 2, FIG. 7B corresponds to Comparative Example 3, and FIG. 7C corresponds to Example 16. As is apparent from the results shown in FIGS. 7A to 7C, the effect of adding the specific metal cations to the aqueous electrolyte solutions was able to be confirmed when $TiO_2$ was used as the anode active material as well. It is believed that in the case of Comparative Example 3, the concentration of a lithium salt of 5 m, which was low, did not make the reduction potential window of the aqueous electrolyte solution expand, and did not make $TiO_2$ work.

As described above, the aqueous electrolyte solution of this disclosure can be said to be able to suppress reductive decomposition of the aqueous electrolyte solution on the portion of a high work function of the surface of the anode (surfaces of the conductive additive and the current collector) regardless of the anode active material.

6. Addition

The examples show the cases where $LiFePO_4$ was used as the cathode active material in the counter electrode (cathode), and Ti was used as the cathode current collector. The cathode active material and the cathode current collector are not specifically limited to them. The cathode active material and the cathode current collector may be properly determined according to the potential window of the aqueous electrolyte solution on the oxidation side etc.

The examples show the cases where acetylene black was used as the conductive additive. The conductive additive is not limited to this. A carbon material other than acetylene black, or a metallic material may be used according to the performance of the battery to be aimed.

The examples show the cases where LiTFSI was used as the lithium salt, which was an electrolyte. The lithium salt is not limited to this. It is obvious that regardless of the lithium salt and its concentration in the aqueous electrolyte solution, the effect of the metal cation is obtained. Examples of other lithium salts include LiFSI.

The examples show the cases where Ti was used as the anode current collector. The anode current collector is not limited to this. The anode current collector is formed of a material of a low work function in some embodiments. For example, part of the surface of the anode current collector which is in contact with the aqueous electrolyte solution is formed of a material whose main constitution is at least one selected from the group consisting of Al, Ti, Pb, Zn, Sn, Mg, Zr and In in some embodiments, which are Ti, Pb, Zn, Sn, Mg, Zr and In in some embodiments, and Ti in some embodiments in view of stability.

INDUSTRIAL APPLICABILITY

The aqueous lithium ion secondary battery using the aqueous electrolyte solution of this disclosure has a large discharge capacity, and can be used in a wide range of power sources such as an onboard large-sized power source and a small-sized power source for portable terminals.

What is claimed is:

1. An aqueous electrolyte solution that is used for an aqueous lithium ion secondary battery, the aqueous electrolyte solution comprising:
    water;
    a lithium ion;
    at least one imide based anion selected from a TFSI anion and a FSI anion; and
    at least one metal cation selected from a cerium ion and a neodymium ion,
    wherein pH of the aqueous electrolyte solution is 3 to 12, and
    a content of the metal cation is no less than 0.0001 mol and no more than 0.001 mol per kilogram of the aqueous electrolyte solution.

2. The aqueous electrolyte solution according to claim 1, wherein the metal cation further comprises a hafnium ion.

3. An aqueous lithium ion secondary battery comprising:
    a cathode;
    an anode; and
    the aqueous electrolyte solution according to claim 1.

4. The aqueous lithium ion secondary battery according to claim 3, wherein the anode contains at least one titanium-containing oxide selected from lithium titanate and titanium oxide as an anode active material.

5. The aqueous lithium ion secondary battery according to claim 3, wherein
    the anode includes an anode active material layer including an anode active material and a conductive additive,
    the conductive additive is formed of a material having a first work function;
    a metal forming the metal cation contained in the aqueous electrolyte solution has a second work function; and
    the first work function is greater than the second work function.

6. The aqueous lithium ion secondary battery according to claim 5, wherein the conductive additive is formed of a carbon material.

7. The aqueous lithium ion secondary battery according to claim 3, wherein
    the anode includes an anode current collector, and
    part of a surface of the anode current collector, the part being in contact with the aqueous electrolyte solution, is formed of a material that is mainly constituted of at least one selected from the group consisting of Al, Ti, Pb, Zn, Sn, Mg, Zr, and In.

* * * * *